(12) United States Patent
Boettcher

(10) Patent No.: US 7,436,186 B2
(45) Date of Patent: Oct. 14, 2008

(54) METHOD FOR GENERATING A SIMULATED SENSOR SIGNAL PATTERN FOR A MARKING GAP IN A SIGNAL-GENERATING DISK

(75) Inventor: Jens Boettcher, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/542,332

(22) Filed: Oct. 2, 2006

(65) Prior Publication Data

US 2007/0085547 A1    Apr. 19, 2007

(30) Foreign Application Priority Data

Sep. 30, 2005    (DE) .................. 10 2005 047 088

(51) Int. Cl.
*F02P 17/00*    (2006.01)
*F02P 5/00*    (2006.01)
*G06G 7/70*    (2006.01)

(52) U.S. Cl. .................. 324/392; 324/378; 123/406.61; 701/101

(58) Field of Classification Search .................. 324/381, 324/380, 378, 379, 392; 73/116, 117.3; 123/406.11, 123/406.12, 406.37, 406.39, 406.61, 406.62; 701/101

See application file for complete search history.

(56) References Cited

U.S. PATENT DOCUMENTS

| | | | | |
|---|---|---|---|---|
| 4,355,613 A | * | 10/1982 | Rode et al. ............. | 123/406.65 |
| 4,766,865 A | * | 8/1988 | Hartel ................... | 123/476 |
| 6,459,267 B1 | * | 10/2002 | Nishimoto .............. | 324/378 |
| 6,499,341 B1 | * | 12/2002 | Lodise et al. .......... | 73/117.3 |
| 6,566,867 B1 | * | 5/2003 | Schroeder et al. ...... | 324/207.22 |
| 6,600,322 B1 | * | 7/2003 | Nussbaum ............... | 324/380 |
| 6,644,273 B1 | * | 11/2003 | Hagari et al. .......... | 123/406.18 |
| 6,885,934 B1 | * | 4/2005 | Bochum .................. | 701/114 |
| 7,082,363 B2 | * | 7/2006 | Baumann et al. ......... | 701/115 |
| 7,159,571 B2 | * | 1/2007 | Kassner .................. | 123/479 |
| 7,263,959 B2 | * | 9/2007 | Kataoka et al. ......... | 123/179.4 |
| 2006/0225702 A1 | * | 10/2006 | Gray et al. ............. | 123/406.59 |

* cited by examiner

*Primary Examiner*—Diego Gutierrez
*Assistant Examiner*—Hoai-An D Nguyen
(74) *Attorney, Agent, or Firm*—Kenyon & Kenyon LLP

(57) ABSTRACT

A method for generating a simulated sensor signal pattern for a marking gap of a signal-generating disk which is coupled with a crankshaft of an internal combustion engine, the signal-generating disk having a marking by the alternating positioning of teeth and tooth interstices, and the marking gap being formed by an enlarged tooth interstice or an enlarged tooth, and at least one sensor being assigned to the signal-generating disk, the sensor in each case being able to generate an electrical signal that is able to assume at least two signal levels (high, low), one of the signal levels (high, low) being assigned to a tooth and the other to a tooth interstice, and a simulated sensor signal pattern being approximated for the marking gap from the signal pattern of the signal generated by the sensor, wherein the signal pattern lying before the marking gap in time is used for the approximation.

4 Claims, 3 Drawing Sheets

METHOD FOR GENERATING A SIMULATED SENSOR SIGNAL PATTERN FOR A MARKING GAP IN A SIGNAL-GENERATING DISK

FIELD OF THE INVENTION

The present invention relates to a method for generating a simulated sensor signal pattern for a marking gap in a signal-generating disk which is coupled with a crankshaft of an internal combustion engine, the signal-generating disk having a marking formed by the alternating positioning of teeth and tooth interstices, and the marking gap being formed by an enlarged tooth interstice or an enlarged tooth, and at least one sensor being assigned to the signal-generating disk, the sensor in each case being able to generate an electrical signal that is able to assume at least two signal levels, one of the signal levels being assigned to a tooth and the other to a tooth interstice, and a simulated sensor signal pattern being approximated for the marking gap from the signal pattern of the signal generated by the sensor. Furthermore, the present invention relates to an internal combustion engine for implementing the method.

BACKGROUND INFORMATION

One of the central tasks for controlling internal combustion engines is the determination of the crankshaft angle. Known design approaches use incremental sensors on the crankshaft and the camshaft. Ones commonly used are signal-generating disks having incremental markers in the form of the alternating positioning of teeth and tooth interstices on the signal-generating disk which in the cooperation of the signals from crankshaft and camshaft make possible a determination of the engine position with respect to an identified null position of the crankshaft (null marking). On known signal-generating disks, a marking gap is assigned to this null position which, as a rule, takes the form of an enlarged tooth clearance between two teeth, but is also able to have the form of an enlarged tooth. In response to the rotation of the crankshaft, and, with that, the signal-generating disk, the teeth are led past the sensors, whereby electrical signals are triggered in the sensors which are used to determine the crankshaft angle, and ultimately for the control and regulation of the internal combustion engine. Since no signal changes are able to be output by the sensors in response to the leading past of the marking gap, and since, however, the control and regulation of the internal combustion engine requires signal changes also for the angular section of the marking gap, it is known that one may approximate simulated sensor signal patterns from the signal pattern of the teeth and the tooth interstices that follow the marking gap.

Taking into account simulated sensor signal patterns in the control and regulation of an internal combustion engine is known, for example, from German Published Patent Application No. 43 13 331. In the method described there, a signal-generating disk in the form of a rotating part of two sensors is recorded, after detection of the improper occurrence of sensor signals in the form of angle mark signals, an operation under emergency conditions being started, in which first and second values are computed for the simulation of angle mark signals from the sequence in time of the signals of the second sensor.

The functions of the control and regulation of internal combustion engine require the signals generated by the sensors, as a rule, immediately after their generation. This applies especially to the position of the crankshaft, which represents an essential variable for the control and regulation of the internal combustion engine. However, since no signal changes are generated in response to the leading past of the marking gap, one can only fall back on the simulated sensor signal patterns described above. However, the teeth following the marking gap are generated time-wise only after the leading of the marking gap past the sensor being used, and are therefore not available for the duration of the leading past. This is a disadvantage particularly for the functions described above, which require the signals directly after their generation, with respect to optimum control and regulation. Therefore, it is the object of the present invention to state a method, using which a simulated sensor signal pattern can be made available even for the duration of the leading of the marking gap past the sensor.

SUMMARY OF THE INVENTION

The disadvantages named above, in the related art, are overcome by a method for generating a simulated sensor signal pattern for a marking gap of a signal-generating disk that is coupled with a crankshaft of an internal combustion engine, the signal-generating disk having a marking formed by the alternating positioning of teeth and tooth interstices, and the marking gap being formed by an enlarged tooth interstice or an enlarged tooth, and at least one sensor being assigned to the signal-generating disk, the sensor in each case being able to generate an electrical signal that is able to assume at least two signal levels (high, low), one of the signal levels (high, low) being assigned to a tooth and the other to a tooth interstice, and a simulated sensor signal pattern being approximated for the marking gap from the signal pattern of the signal generated by the sensor, the signal pattern lying before the marking gap in time being used for the approximation.

The method according to the present invention makes possible the generation of simulated sensor signal patterns, even for the duration of the leading of the marking gap past the sensor, and, just as the signal patterns generated by real teeth, these are consequently immediately available for the control and regulation of the internal combustion engine.

In one further refinement of the method, a regression method is used for the approximation of the simulated sensor signal pattern, the signal pattern of several, for instance, four or five, successive teeth and tooth interstices lying before the marking gap being preferably used for the approximation. In a preferred specific embodiment, the regression method is a linear regression method. The regression coefficients resulting from the use of the linear regression method are used for the computation of the time durations of the signal levels of the simulated sensor signal and their position in the marking gap. Therefore, seen as a whole, by the application of the linear regression method, simulated sensor signal patterns may be generated for the marking gap which, because of the linear regression used, represent good approximations to the situation not having marking gaps.

The problem mentioned at the outset is also overcome by an internal combustion engine having a signal-generating disk that is coupled with a crankshaft of the internal combustion engine, the signal-generating disk having a marking formed by the alternating positioning of teeth and tooth interstices, and furthermore a marking gap that is formed by an enlarged tooth interstice or an enlarged tooth, and at least one sensor being assigned to the signal-generating disk, the sensor in each case being able to generate an electrical signal that is able to assume at least two signal levels, one of the signal levels being assigned to a tooth and the other to a tooth interstice, and a simulated sensor signal pattern being approximated for the marking gap from the signal pattern of the signal generated by the sensor, the signal pattern lying before the marking gap in time being used for the approximation.

DETAILED DESCRIPTION

Figure 1:
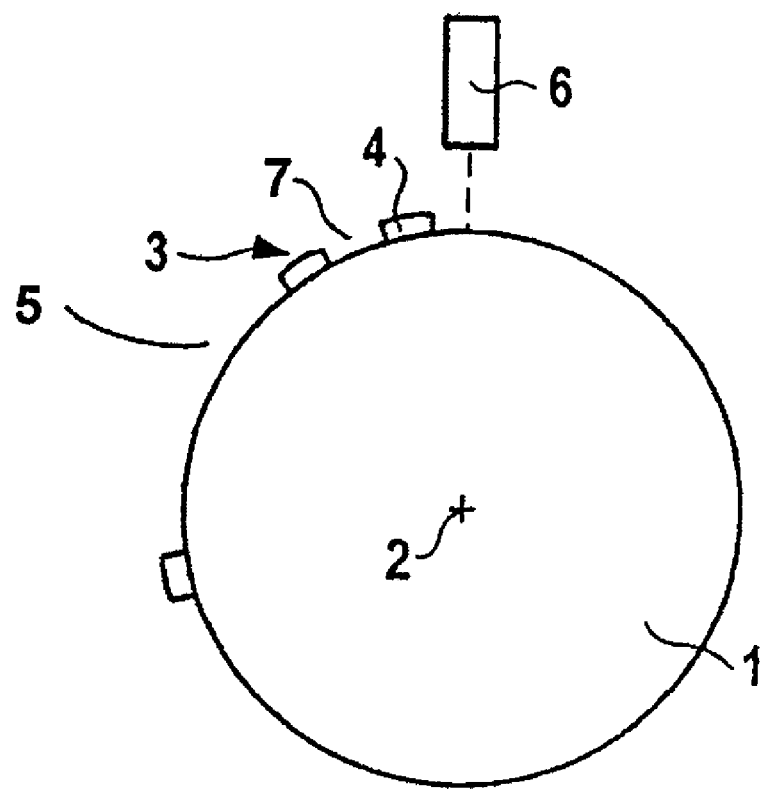
FIG. 1 shows a sketch of a signal-generating disk and a sensor.

FIG. 1 shows a sketch having a signal-generating disk 1 which is, for example, situated directly on a crankshaft or a camshaft of an internal combustion engine, or is indirectly connected using gear elements with respect to the rotation with the camshaft. Signal-generating disk 1 rotates about axis 2. Markings 3 are situated at the outer circumference of signal-generating disk 1. The markings are made up, for example, of teeth 4, which are positioned above the outer circumference of signal-generating disk 1. Interstices 7 are situated in each case between the teeth. A marking gap 5 in the form of a greater tooth clearance between two teeth marks an identified null position. A tooth 4 and the adjacent tooth interstice 7 in each case take a course over a circumferential angle of approximately 6°.

A sensor 6 is situated at signal-generating disk 1. In response to a rotation of the crankshaft, and therewith signal-generating disk 1, teeth 4 are led past sensor 6. This, for example, triggers an electrical signal in sensor 6. Sensor 6 may be a Hall effect sensor, an anisotropic magnetoresistive sensor (AMR sensor), an inductive or a capacitive sensor, or the like. Alternatively, the latter may also function optically, for instance, by measuring optical changes caused by teeth 4.

Figure 2:
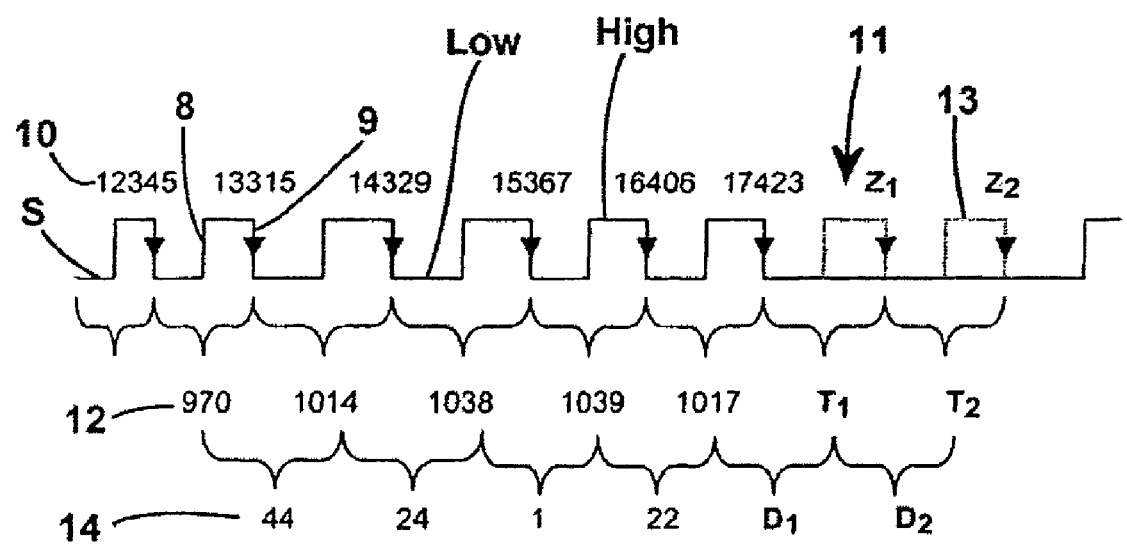
FIG. 2 shows a sketch of the signal pattern of the sensor in response to a signal-generating disk having a marking gap.

A signal pattern S of sensor 6, plotted against time, is shown schematically in FIG. 2. The alternating leading past of teeth 4 and tooth interstices 7 generates a rectangular signal in signal pattern S, which assumes the values "high" and "low", in the example shown, the value "high" being assigned to a tooth 4 and the value "low" being assigned to a tooth interstice 7. The transition from "low" to "high" being designated as rising slope 8 and the transition from "high" to "low" being designated as descending slope 9.

The "low" level section shown at the right end of signal pattern S, that is longer compared to the remaining signal sections, corresponds to the leading of marking gap 5 past sensor 6, the marking gap 5 of signal-generating disk 1 at issue being formed by "leaving out" two teeth 4. The numbers of upper row of numbers 10 are the points in time, measured in count values of a counter (not shown) of descending slopes 9. That means the points in time at which the transition from "high" to "low" takes place.

Figure 3:
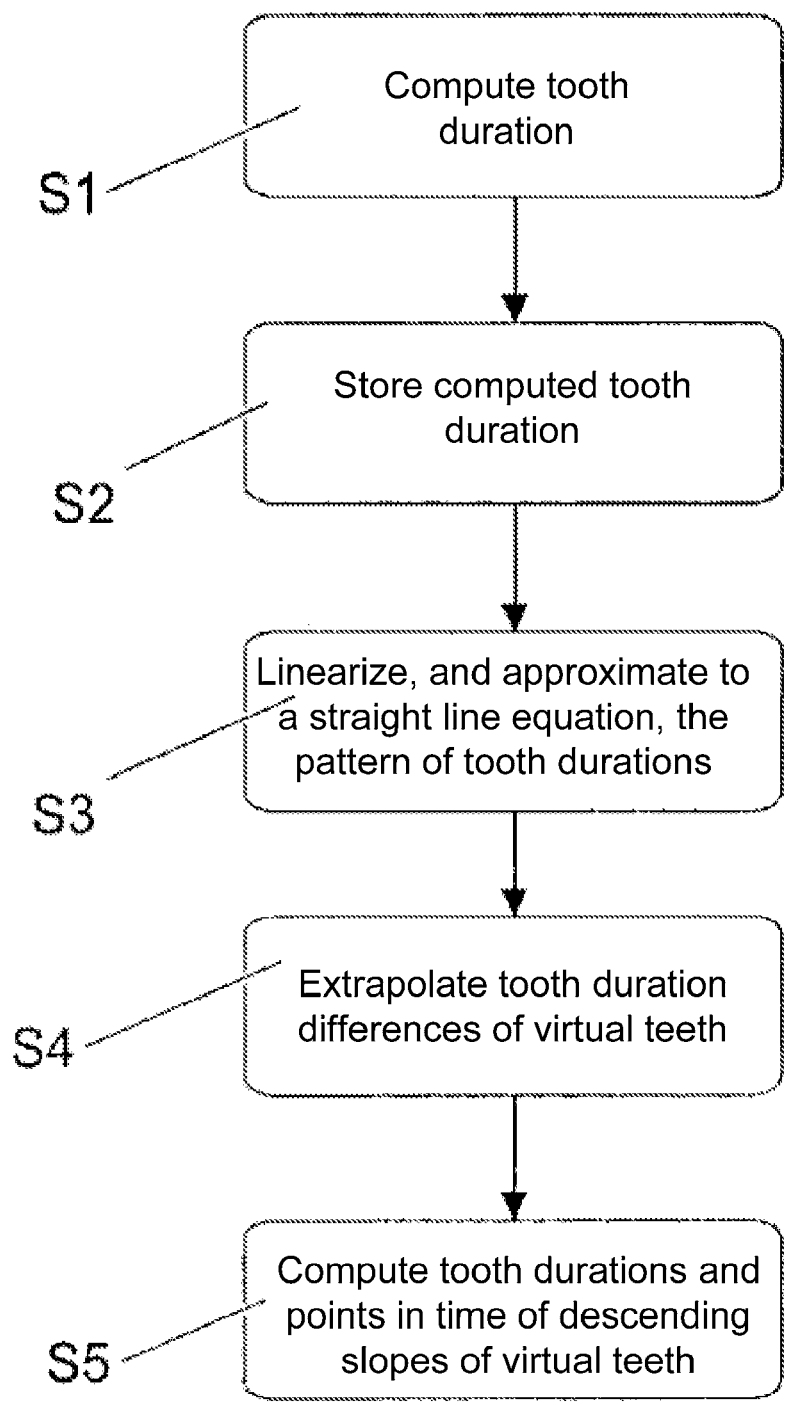
FIG. 3 shows a schematic method diagram for the approximation of a simulated sensor signal pattern for a marking gap.

Descending slopes 9 are used as interrupt instructions in the exemplary embodiment described here, and are transmitted to a processor 50 of the exemplary embodiment which, among other things, is provided for processing sensor signals supplied to it, using software running on it. When the processor 50 receives the interrupt instruction in the form of descending slope 9, it interrupts its current computations and reads out the current count value of the counter. When the marking gap is led past sensor 6, since the latter is not able to output a signal change and, with that, also no interrupt instruction, but the control and regulation of the internal combustion engine requires signal changes also for marking gap 5, simulated sensor signal patterns 11 in the form of "virtual teeth" 13 are approximated from preceding signal pattern S. This approximation is described below, with the aid of the method diagram shown in FIG. 3, in connection with FIG. 2.

As input variables for the approximation in the case at hand, the points in time of descending slopes 9 of last four teeth 4 before marking gap 5, ascertained using the counter, are used (cf. number row 10 in FIG. 2), a parabolic rotary speed pattern being assumed for the duration of these four teeth 4. In this instance, taking into consideration four preceding teeth 4 is of advantage, since first of all the assumption of the parabolic rotary speed pattern for this value range is valid, and secondly the accuracy of the approximation is still sufficiently great. Regarded in an overall manner, therefore, in the case at hand, a number of four or alternatively five considered teeth 4 represents a good compromise.

From these points in time of descending slopes 9 of the four preceding teeth 4, first of all tooth durations (cf. tooth row 12 in FIG. 2) are computed and stored (cf. also steps S1 and S2 in FIG. 3), the tooth durations being the times, measured in the count values of the counter used, between two successive descending slopes 9. Thereafter, in step S3, the pattern of tooth durations is linearized by forming differences and is approximated to a straight line equation of the form $y = c_1 * x + c_0$, in this exemplary embodiment x being a whole number indexing of teeth 4 respectively lying before marking gap 5 (that is, $x=4$ indexes the last tooth before marking gap 5, since, in this exemplary embodiment, the last four teeth lying before marking gap 5 are considered in the computation; correspondingly, $x=3$ indexes next-to-last tooth 4 before marking gap 5, etc.). Y is the tooth duration assigned in each case to the considered four teeth 4 ($x=1$ to $x=4$). Lastly, the regression coefficients $c_0$ and $c_1$ determined from the linearization are stored.

The regression coefficients $c_1$ and $c_0$ are computed according to the known equation $$c_1 = \frac{N * \sum_{i=1}^{N} (y_i * x_i) - \sum_{i=1}^{N} y_i * \sum_{i=1}^{N} x_i}{N * \sum_{i=1}^{N} x_i^2 - \left(\sum_{i=1}^{N} x_i\right)^2}$$

$$c_0 = \frac{\sum_{i=1}^{N} y_i * \sum_{i=1}^{N} x_i^2 - \sum_{i=1}^{N} (y_i * x_i) * \sum_{i=1}^{N} (x_i)}{N * \sum_{i=1}^{N} x_i^2 - \left(\sum_{i=1}^{N} x_i\right)^2}$$

N being the total number of supporting values taken into consideration, which, in the case at hand, is the total number of teeth 4 taken into consideration (that is, $N=4$). In this approximation, interferences included in the signal (caused by mechanical tolerances and vibrations) are also partially compensated for. The computations of $c_0$ and $c_1$ are considerably simplified if N is known and constant, as in the exemplary embodiment at hand, and x assumes values only from 1 to N.

For N=4, one obtains for c0 and c1:

$$c_1 = \frac{0.4 * \sum_{i=1}^{N}(y_i * i) - \sum_{i=1}^{N} y_i}{2}$$

$$c_0 = \frac{3 * \sum_{i=1}^{N} y_i - \sum_{i=1}^{N}(y_i * i)}{2}$$

In the present exemplary embodiment, these equations are able to be coded using limited resources and few assembler instructions.

Using regression coefficients c0 and c1 stored in step S3, for which the values 67 and −22 were determined, and using the appropriate straight line equation y=c1*x+c0, tooth duration differences D1 and D2 (cf. tooth row 14 in FIG. 2) of virtual teeth 13, that are adjacent to one another, are subsequently extrapolated in step S4, as follows (cf. also step S4 in FIG. 3):

$$D1 = c1*5 + c0 = -43;$$

$$D2 = c1*6 + c0 = -65$$

From these extrapolated tooth duration differences, tooth durations T1, T2 and points in time Z1, Z2 of descending slopes 9 of virtual teeth 13 can then be computed as follows (cf. also step S5 in FIG. 3):

$$D1 = -43 \Rightarrow T1 = 1017 + D1 = 974 \Rightarrow Z1 = 17423 + T1 = 18397;$$

$$D2 = -65 \Rightarrow T2 = T1 + D2 = 909 \Rightarrow Z2 = Z1 + T2 = 19306$$

Therefore, seen as a whole, because of the approximation method described here, simulated sensor signal patterns 11 may be generated in the form of "virtual teeth" 13 for marking gap 5, which, because of the linear regression used, represent good approximations to the situation not having marking gaps.

Since, for the approximation, the method falls back on the signal pattern of teeth 4 and tooth interstices 7 lying before the marking gap in time, using the method according to the present invention, virtual teeth 13 are able to be generated that are also present for the duration of the leading of marking gap 5 past sensor 6. Consequently, these are available directly for the control and regulation of the internal combustion engine, just as the signals generated by real teeth 4.

The method according to the present invention works as follows:

In the first step, S1, the points in time of the descending slopes of the teeth taken into consideration are determined by reading out the appropriate count values of the counter. In subsequent step S2, the tooth durations of the teeth taken into consideration are computed from the points in time of the descending slopes and storing of the computed tooth durations. In step S3, the approximation of the computed tooth duration pattern follows using a linear regression and the storing of ascertained regression coefficients c0 and c1.

Thereupon there follows in step S4 the extrapolation of tooth duration differences D1 and D2 of the virtual teeth, as follows:

$$D1 = c1*N + C0,$$

$$D2 = C1*(N+1) + C0,$$

where N is the number of the teeth taken into consideration.

In step S5 there follows the computation of tooth durations T1, T2 and points in time Z1 and Z2 of the descending slopes of the virtual teeth, as follows:

$$T1 = Xn + D1, \quad T2 = T1 + D2,$$

$$Z1 = Ln + T1, \quad Z2 = Z1 + T2,$$

Xn being the tooth duration and Ln the point in time of the descending slope of the last of the N teeth taken into consideration, which is immediately before the marking gap.

What is claimed is:

1. A method for generating a simulated sensor signal pattern for a marking gap of a signal-generating disk, comprising:
   coupling the signal-generating disk with a crankshaft of an internal combustion engine;
   forming a marking of the signal-generating disk by an alternating positioning of teeth and tooth interstices;
   forming a marking gap by one of an enlarged tooth interstice and an enlarged tooth;
   assigning at least one sensor to the signal-generating disk;
   causing the at least one sensor to generate an electrical signal that is able to assume at least two signal levels;
   assigning one of the signal levels to a tooth;
   assigning another one of the signal levels to a tooth interstice; and
   approximating a simulated sensor signal pattern for the marking gap from a signal pattern of the signal generated by the at least one sensor;
   wherein
      the signal pattern used for the approximation lies before the marking gap in time;
      a linear regression technique is used for the approximation of the simulated sensor signal pattern; and
      regression coefficients resultings from a use of the linear regression technique are used for a computation of time durations of the signal levels of the simulated sensor signal pattern and their position in the marking gap.

2. The method as recited in claim 1, wherein the signal pattern used for the approximation is of a plurality of successive teeth and tooth interstices.

3. An internal combustion engine, comprising:
   a crankshaft;
   a signal-generating disk coupled with the crankshaft, the signal-generating disk including a marking formed by alternating positioning of teeth and tooth interstices, and a marking gap formed by one of an enlarged tooth interstice and an enlarged tooth; and
   at least one sensor assigned to the signal-generating disk, the at least one sensor in each case configured to generate an electrical signal that is able to assume at least two signal levels, one of the signal levels being assigned to a tooth and the other signal level to a tooth interstice, wherein:
      a simulated sensor signal pattern is approximated for the marking gap from a signal pattern of the signal generated by the at least one sensor;

the signal pattern used for the approximation lies before the marking gap in time;

a processor applies a linear regression technique for the approximation of the simulated sensor signal pattern; and the processor, based on regression coefficients resulting from a use of the linear regression technique, computes time durations of the signal levels of the simulated sensor signal pattern and their position in the marking gap.

4. The internal combustion engine recited in claim 3, wherein the signal pattern used for the approximation is of a plurality of successive teeth and tooth interstices.

* * * * *